May 7, 1968     F. W. BURK     3,381,393

SCHEDULING DEVICE

Filed April 20, 1966     2 Sheets-Sheet 1

INVENTOR
Floyd W. Burk
BY
ATTORNEYS

May 7, 1968   F. W. BURK   3,381,393
SCHEDULING DEVICE
Filed April 20, 1966   2 Sheets-Sheet 2
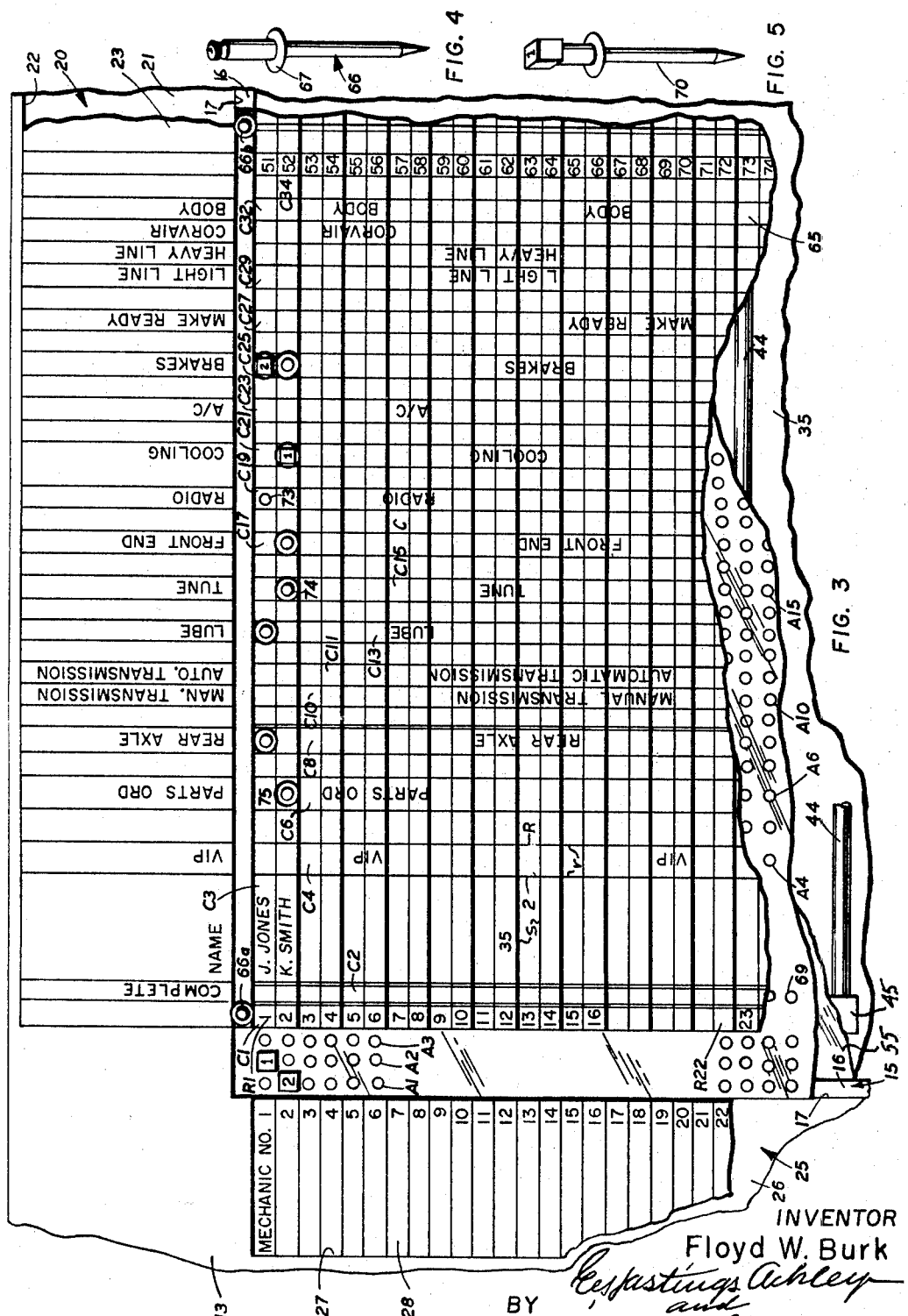
INVENTOR
Floyd W. Burk
BY Hastings Ashley
and
Walter J. Jayne
ATTORNEYS

United States Patent Office 3,381,393
Patented May 7, 1968

3,381,393
SCHEDULING DEVICE
Floyd W. Burk, Dallas, Tex., assignor of fifty percent to
John H. Witt, Dallas, Tex.
Filed Apr. 20, 1966, Ser. No. 543,890
16 Claims. (Cl. 35—24)

ABSTRACT OF THE DISCLOSURE

An information presentation and scheduling device comprising a panel with a plurality of apertures therein disposed in columns and rows. A record sheet is positionable over the panel. The sheet has columns and rows of spaced lines which align with the apertures in the panel. A light source is contained beneath the panel and a plurality of pins are provided to be selectively inserted in the apertures, thereby piercing the sheet. Removal of the pins allows light to project upwardly through the pierced sheet, thereby indicating the previous location of the pins.

---

This invention relates to presentation devices and more particularly to information presentation and scheduling devices.

An object of this invention is to provide an information presentation device which is usable to schedule operations, such as repair work on vehicles, and which provides a visual indication of the status of such operations at any time.

Another object is to provide an information presentation device for use in service departments of garages, automobile sales agencies, and the like which may be used to schedule efficiently work in the various shops of the service department and obtain optimum utilization of the time of the mechanics available to perform work in the different shops.

Still another object is to provide an information presentation device which will provide a permanent record of the number of jobs performed in each shop of the service department in any one day.

A further object is to provide an information presentation device which includes a panel having a plurality of apertures arranged in vertical columns and horizontal rows and a record sheet positionable over the panel and having vertical columns and horizontal rows defined by spaced perpendicular and parallel lines wherein the columns of the record sheet correspond to the shops of the service department.

A still further object is to provide an information presentation device of the type described which includes a plurality of pins insertable through the record sheet into the apertures of the panel and piercing the record sheet, the presence of the pins in particular rows and columns of the record sheet indicating that work is to be performed on particular vehicles in particular shops, and a plurality of mechanic pins bearing indicia insertable through the record sheet into the apertures of the panel to indicate that particular mechanics have possession of particular vehicles and are working thereon.

A still further object is to provide an information presentation device of the type described having means for projecting light upwardly through the apertures of the panel and of the record sheet whereby when the pins are removed when work has been completed on particular vehicles in particular shops, the light shining through the apertures indicates that particular vehicles have had certain repair work performed thereon.

Another object is to provide an information presentation device wherein the light projected through the apertures is colored in order that the perception of light projected through the perforations of the panel and the record sheet be facilitated.

Still another object is to provide an information presentation device wherein the panel is mounted on a top wall of a cabinet closing an opening of the top wall and wherein the top wall is provided with vertical indicia means at one side and horizontal indicia means along the top of the panel, the horizontal means bearing indicia identifying various shops of the vehicle and being in alignment with the corresponding vertical columns of the record sheet and the vertical indicia means identifying particular mechanics.

Additional objects and advantages of the invention will be readily apparent from the reading of the following description of a device constructed in accordance with the invention, and reference to the accompanying drawings thereof, wherein:

FIGURE 3 is a fragmentary top view of the device showing the record sheet in position over the panel of the information presentation device;

FIGURE 4 is a perspective view of a pin used with the information presentation device; and FIGURE 5 is a perspective view of an indicia pin of the information presentation device.

Figure 1:
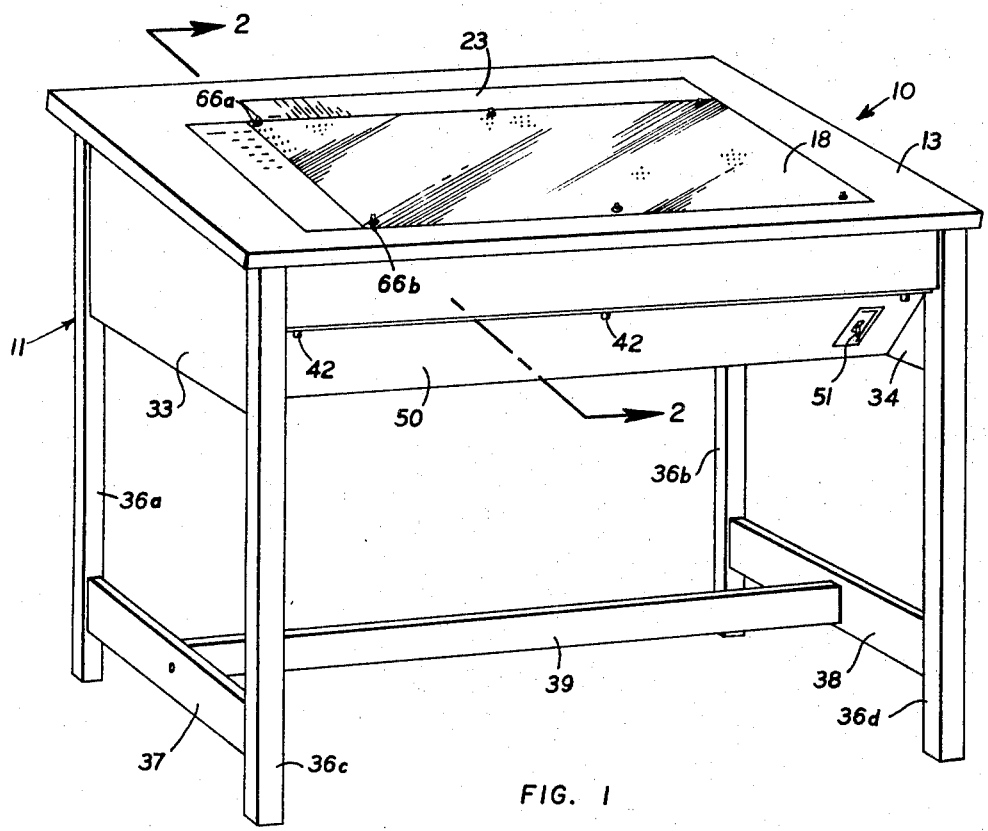
FIGURE 1 is a perspective view of an information device embodying the invention without a record sheet disposed over the panel.
Figure 2:
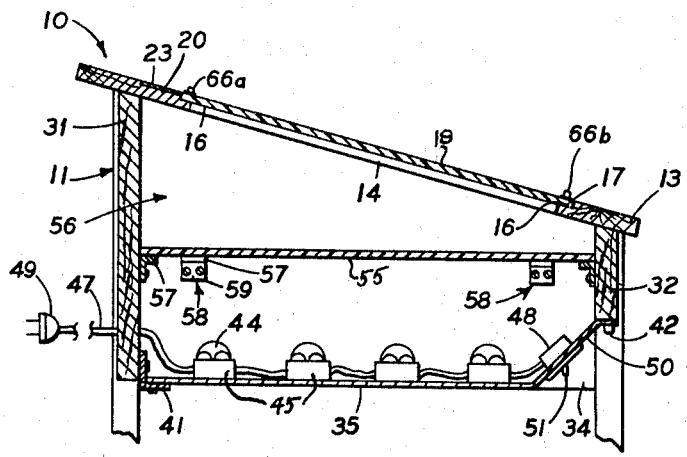
FIGURE 2 is a fragmentary schematic sectional view taken on line 2—2 of FIGURE 1.

Referring now to the drawings, the presentation device 10 embodying the invention includes a cabinet 11 having a rectangular downwardly and forwardly sloping top wall 13. The top wall has a rectangular opening 14 and an upwardly opening recess 15 which extends about the opening and provides an upwardly facing support surface 16 and a stop surface 17 which extends perpendicularly from the support surface. A panel 18 of plastic or other suitable substance has its peripheral portions disposed in the recess 15 and supported on the support surface 16. The edge surfaces of the panel are engageable by the rectangular stop surface which prevents movement of the panel relative to the top wall.

The top wall may also have a horizontal top recess 20 above the recess 15 which provides a top support surface 21 and a stop shoulder 22 which extends perpendicularly upwardly from the support surface and defines the upper end of the top recess 20. An indicia or information strip 23 may be positioned in the recess 20 and secured to the top wall in any suitable manner, as by an adhesive. Similarly a vertical side recess 25 may extend from the left side of the recess 15 and provide a support surface 26 and a stop surface 27 which extends upwardly perpendicularly from the support surface. An indicia strip 28 disposed in the recess 25 may be rigidly secured to the top wall by an adhesive or the like.

The cabinet includes front and rear walls 31 and 32, end walls 33 and 34, and a bottom wall 35. The rear wall extends between the rear legs 36a and 36b of the cabinet, the front wall extends between the front legs 36c and 36d, the end wall 33 extends between the legs 36a and 36c and the end wall 34 extends between the legs 36b and 36d. The walls are rigidly secured to the legs and to the top wall in any suitable manner, as by bolts, screws and the like. The legs 36a and 36c may be secured to one another adjacent their bottom edges by a side brace 37, the legs 36b and 36d may be secured to one another by a similar side brace 38, and the two braces in turn may be connected by a transverse brace 39 which extend between the two side braces and is rigidly secured thereto in any suitable manner, as by screws. The top end surfaces of the end and side walls of the cabinet, as well as of the posts, extend downwardly and inwardly to conform to the bottom surface of the downwardly and forwardly sloping top wall 13.

The bottom wall which extends between the front and rear walls and the end walls may be connected to the rear wall by a suitable hinge 41 and to the bottom surface of the front wall 32 by suitable bolts 42. The bottom wall is hingedly mounted in order to facilitate access to a plurality of fluorescent lights 44 which are mounted on the bottom wall. The elongate fluorescent lights are connected at their opposite ends to the usual light fixtures 45 rigidly secured to the bottom wall in any suitable manner, as by screws and the like. Electric current to the fixtures 45 is transmitted through a cable 47 which extends outwardly of the cabinet through a suitable aperture in the rear wall 31 and a switch 48. The cable at its outer end is provided with the usual plug 49 by means of which it may be connected to an electric circuit outlet. The manually operated switch 48 is mounted on the upwardly inclined forward portion 50 of the bottom wall. The toggle handle 51 of the switch extends outwardly of the inclined portion for easy access by the operator. The switch 48 when in its closed position connects the fluorescent lights across the two conductors of the cable and when in its open position disconnects the lights from across the two conductors.

A translucent filter plate 55, of colored glass, plastic and the like which transmits only light of a predetermined color therethrough is supported in the chamber 56 of the cabinet between the panel 18 and the fluorescent lights 44 on the top inwardly extending horizontal legs 57 of support brackets 58 whose vertical flanges 59 are rigidly secured to the cabinet walls by means of screws.

A record sheet 65 is adapted to overlie the panel 18 and is releasably securable thereto by means of pairs of top and bottom pins 66a and 66b, respectively, whose pointed lower ends are adapted to pierce the record sheet and extend through suitable apertures of the panel 18. The pins have flanges 67 which limit their downward movement through the apertures of the panel.

The record sheet 65 has a plurality of vertical columns C1–Cn and horizontal rows R1–Rn defined by vertical lines r and horizontal lines s imprinted on the top surface of the record sheet. The rows are numbered numerically in the first column C1 to indicate the order in which vehicles are received in the service shop. The second column C2 may be the "Complete" column and when one of the pins 66 is inserted through the record sheet in a particular row of column C2, through an aperture 69 in the panel aligned with a row in column C1, it indicates that the operations or repairs to the particular vehicle identified in such row of column C3 have been completed. The third column of the record sheet is the identification column wherein the vehicles may be identified as by the writing name of the owner, the make and license number of the vehicle or any similar identification as desired. The fourth column C4 may be labeled a VIP column so that when a pin 66 is inserted in a row of column C4 it indicates that the repair or other work to be performed on the vehicle identified in the same row of column C3 should have a preferred or priority status.

Other columns of the work sheet indicate various shops or departments of the service shop. For example, column C6 may indicate required parts are not in stock when requested by the mechanic on his initial trip to Parts Department, column C8 may indicate the rear axle shop, and so on. The indicia strip 23 and the columns of the sheet have the names of the departments imprinted thereon to facilitate the location of a particular column corresponding to a particular shop.

The plate 18 is provided with a plurality of columns A4–An of apertures therethrough which are in alignment with the rows of the columns C4–Cn so that a pin 66 may be inserted through the record sheet and such apertures at each row of each column.

The panel 18 also at its extreme left hand side has three columns A1, A2 and A3 of apertures which are arranged in horizontal rows corresponding to and aligned with the rows R1–Rn of the paper sheet of the record sheet. The indicia strip 28 may have imprinted thereon designations of mechanics, such as mechanics No. 1, No. 2 and so on. If desired the names of the mechanics may be imprinted on the strip. One or more pins 70 are provided with indicia designating each mechanic. As illustrated in the present case, the mechanic pins 70 have the numbers corresponding to the numbers of particular mechanics.

In use, at the beginning of a work day, assuming that no work has been carried over from the preceding day, the pins 70 of each mechanic are positioned in the apertures of the columns A1, A2 and A3 of the panel and in horizontal alignment with the name or designation of each mechanic on the indicia strip 28. The record sheet 65 is placed over the panel 18 as illustrated in FIGURE 3 and secured against movement by means of the pins 66a and 66b inserted therethrough adjacent its top and bottom edges into suitable apertures of the panel 18 provided for this purpose. When a vehicle is received in the service department, a master mechanic receives the comments of the owner, determines the work which is to be performed on the vehicle and writes out on a work sheet, not shown, the operations which are to be performed on the particular vehicle. For example, the master mechanic may indicate on such work sheet that the first vehicle received that day owned by J. Jones must have work performed thereon in the rear axle shop, be lubricated in the lubrication shop, have its radio repaired in the radio shop and its brakes adjusted in the brake shop. The work sheet is then sent to the scheduler who operates the information presentation device 10 and who upon receiving such work sheet writes in the name of the owner, and if desired other identification, in row R1 of column C3 of the record sheet and then inserts pins 66 in row R1, columns C8, C13, C19 and C25, the pins piercing the record sheet and extending through apertures of the panels at these locations. These four pins 66 now indicate the work which must be performed on vehicle No. 1 owned by J. Jones. The scheduler then determines which of these shops has the smallest load and has a mechanic available to perform one of the required operations on this particular vehicle. For example, if the radio shop mechanic No. 4 is available, then a mechanic pin 70 having the indicia "4" thereon is inserted in row R1 column C19 of the work sheet and into the aperture of the plate at this location. The vehicle is now delivered to mechanic No. 4 together with the work sheet which informs him what to do to the radio.

When mechanic No. 1 repairs the radio, he returns the work sheet showing the completion of the work on the radio to the scheduler and the scheduler removes the pin 70 having the indicia 4 which had been inserted in row R1 column C19 of the record sheet and replaces it in one of the apertures of the column A1, A2 or A3 of the panel in horizontal alignment with the designation mechanic No. 4 on the strip 28 thus indicating that the mechanic is available for another job. When the pin bearing the indicia 4 is removed, the aperture 73 previously made by a pin 66 in row R1 column C19 of the record sheet is in alignment with the aperture in row R1 column A19 of the panel so that the colored light which is transmitted through the filter plate is now visible through the apertures of the plate and the record sheet and the scheduler thereafter can see at a glance that the work on the radio of this particular vehicle has been completed.

If a mechanic, for example mechanic No. 2, is now available to work on the brakes of the vehicle No. 1 owned by J. Jones, the scheduler removes the pin 66 which he had previously inserted in row R1 of column C25 of the record sheet and inserts the mechanic pin 70 bearing the indicia 2 on its upper end through the record sheet in row R1 column C25, calls mechanic No. 2 and gives him the work sheet. The mechanic No. 2 pin in row R1 of column C25 now indicates that the vehicle is in the brake shop and that the brakes are being worked thereon by mechanic No. 2. As each operation on the vehicle No. 1 is completed the pin bearing the indicia of the mechanic who has completed such work is withdrawn from the work sheet, another mechanic is assigned to perform the other work required on the vehicle and the pin 70 bearing his indicia is inserted in the appropriate column of row R1. Finally, when the radio, brakes and rear axle of the vehicle No. 1 owned by J. Jones have been repaired and the vehicle has been lubricated, the sheet has a perforation in columns C8, C13, C17, C19 and C25 of row R1. When the last job is performed on the vehicle, the scheduler inserts the pin 66 in row R1, column C2 and the pin in this column C2 indicates that the work on the vehicle No. 1 owned by J. Jones has been completed and the automobile is ready to be delivered to the customer.

When a second vehicle owned by K. Smith is delivered to the service department, the master mechanic prepares a separate work sheet for this vehicle and, for example, indicates on the work sheet that work must be performed on the vehicle in the front end shop, the cooling system shop, the brake shop, and the tune-up shop. The work sheet is then delivered to the scheduler who writes in the name K. Smith in row R2 column C3 of the record sheet and then inserts pins 66 through the record sheet in row R2, columns C15, C17, C21 and C25 into the apertures of the panel. The scheduler then inserts and removes the pins 66 and the mechanic indicia pins 70 in the manner described above as he assigns different mechanics to different shops to perform the required work on vehicle No. 2. Each mechanic, as the vehicle is assigned to him, checks the parts department for the availability of parts needed for the particular repairs to be performed by him. Should the parts department inform any such mechanic that it does not have the parts required for the particular repair to be performed by him, the mechanic informs the scheduler and the master mechanic that the parts department does not have the required parts. The scheduler then inserts a pin 66 in row R2 column C6 and will then be able to determine easily when an inquiry is made as to the status of vehicle No. 2, that before the repairs can be completed parts must be received.

The scheduler can thereafter see at a glance the exact status of the work loads in the various shops, the mechanics who are free, the mechanics who are at work, the work which has been completed on various vehicles and whether any vehicles are ready to be delivered to a customer. In the example illustrated in FIGURE 3, the scheduler can see that the rear axle shop, the lubrication shop, the tune-up shop, the front end shop and the brake shop have jobs which must be assigned to them. That the brake shop is scheduled to perform work on two different vehicles, that parts must be ordered for use on vehicle No. 2 owned by K. Smith, that vehicle No. 2 is now in the cooling system shop and being worked on by mechanic No. 1, and that after the cooling system shop performs the required work assigned thereto, vehicle No. 2 must go to the front end shop, the tune-up shop and the brake shop. The scheduler can also see that with respect to vehicle No. 1 owned by J. Jones, its radio has been repaired, that the vehicle is now in the brake shop being worked on by mechanic No. 2, and after the brake operation has been performed thereon in the brake shop that vehicle No. 1 must go to the rear axle shop and to the lubrication shop.

If the service department processes a relatively great number of vehicles each day, the record sheet and the panel may be of considerable length. For example, the work sheet may have two groups of columns of fifty (50) rows. The rows 51 through 100 of the second group of columns are extensions of the rows 1 through 50, respectively, and the second group of columns will have the same indicia providing the same information as the indicia of the corresponding columns of the first group. The indicia strip 23 will of course have indicia corresponding to the indicia of the second group.

It will now be seen that the scheduler can see at a glance the load in a particular shop, and may determine the preferred sequence in which the repairs on any particular vehicle are to be performed depending on the loads in the particular shops. For example, if he sees that one vehicle is being worked on in the brake shop and another requires not only work in the brake shop but also work in other shops, he will, as in the case of vehicle 2, send such vehicle first to another shop, such as the cooling system shop in the instant example. The scheduler can thus most efficiently schedule the work through the various shops and also ensure optimum utilization of the time of the various mechanics by keeping them loaded full time with work.

It is preferable to provide more than one indicia pin for each mechanic since in some instances it is desirable that each mechanic have one or more jobs assigned to and waiting on him in order that he waste no time between jobs. The order in which the mechanic is to perform the work on the several vehicles assigned to him will of course be determined by the order in which the vehicles are assigned to him. For example, ordinarily if the mechanic has three vehicles, for example 1, 2 and 5 assigned to him at one time, he will first work on vehicle No. 1, then No. 2, and then No. 5 so that the scheduler will know that even though the mechanic has two or three vehicles assigned to him that he is working on the lowest numbered vehicle, the one which arrived first in the service department.

It will be seen that the provision of the light filter causes the colored light which shines through the perforations in the record sheet and the underlying perforations of the plate 18, to be more noticeable than if ordinary white light shone therethrough especially if the area in which the presentation information device is located is well lighted.

It will also be seen that the scheduler can easily and quickly answer all questions from customers regarding the exact status of their cars and can easily give them a fairly accurate estimate as to when the repair work on their vehicles will be completed since he has readily available to him all pertinent information relative to each vehicle, the work loads in the various shops through which the vehicle must be processed and the number of other vehicles having priority over any vehicle in any shop.

If at the end of a work day, the repair work on some of the vehicles has still not been completed, appropriate notations may be made on the record sheet of that day and the information regarding such vehicles which are to be carried over to another day may be transferred to the next day's record sheet in the same manner as described above.

It will be apparent that the record sheet provides a permanent record identifying the cars worked on in a particular day and the work performed in each shop during such day.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An information presentation device including: a panel having a plurality of apertures disposed in vertical columns and horizontal rows; means for projecting light upwardly through said apertures; a record sheet positionable over said panel and having vertical columns and horizontal rows defined by vertical and horizontal spaced lines, said columns and rows of said record sheet being aligned with and over columns and rows of apertures of said panel, said device having indicia identifying at least some of said columns of said record sheet, said record sheet being adapted to have apertures pierced therein by pins insertable therethrough into said apertures, light from said source being projected through said apertures of said record sheet and said panel when pins previously inserted through said record sheet into said apertures of said panel are withdrawn.

2. The information presentation device of claim 1, wherein said source of light projects colored light upwardly through said apertures.

3. The information presentation device of claim 2, wherein said indicia is disposed outwardly of said panel in alignment with said columns and rows of said record sheet when said record sheet is disposed over said panel.

4. The information presentation device of claim 3, wherein said record sheet has indicia identifying at least some of said columns of said record sheet.

5. The information presentation device of claim 1, wherein said indicia is disposed outwardly of said panel in alignment with said columns and rows of said record sheet when said record sheet is disposed over said panel.

6. The information presentation device of claim 5, wherein said record sheet has indicia identifying at least some of said columns of said record sheet.

7. The information presentation device of claim 6, and two sets of pins insertable through said record sheet into said apertures of said panel.

8. The information presentation device of claim 7, wherein the pins of one of said sets have indicia on their top ends.

9. The information presentation device of claim 1, and two sets of pins insertable through said record sheet into said apertures of said panel.

10. The information presentation device of claim 9, wherein the pins of one of said sets have indicia on their top ends.

11. An information presentation device comprising: a cabinet having a top wall provided with an opening; a panel supported on said top wall and closing said opening, said panel having a plurality of apertures disposed in vertical columns and horizontal rows; a record sheet positionable over said panel and having vertical columns and horizontal rows alignable with said apertures of said panel, said device having indicia means identifying at least some of said columns of said record sheet; means in said cabinet for projecting light upwardly through said apertures of said panel, said record sheet being adapted to have apertures pierced therein by pins insertable therethrough into said apertures of said panel, said light being projected upwardly through apertures of said record sheet and the panel when pins previously inserted through said record sheet into such apertures of said panel are withdrawn.

12. The information presentation device of claim 11 and filter means in said cabinet between said panel and said means for projecting light for causing only light of a predetermined color to reach said apertures.

13. The information presentation device of claim 12, said indicia means being carried by said top wall adjacent the top ends of the columns of said record sheet.

14. The information presentation device of claim 13, and second indicia means carried by said top wall at one side of said panel adjacent the ends of said rows of said record sheet.

15. An information presentation device for a service department having a plurality of shops, said information presentation device comprising: a cabinet having a top wall provided with an opening; a panel having a plurality of apertures disposed in vertical columns and horizontal rows; means for projecting light upwardly through said apertures; a record sheet positionable over said panel and having vertical columns and horizontal rows defined by vertical and horizontal spaced lines, said columns and rows of said record sheet being aligned with and over columns and rows of said panel, said device having indicia identifying at least some of said columns of said record sheets as corresponding with shops of the service department, said record sheet being adapted to have apertures pierced therein by pins insertable therethrough into said apertures, light from said source being projected through said apertures of said record sheet in said panel when pins previously inserted through said record sheet into said apertures of said panel are withdrawn.

16. The information presentation device of claim 15 wherein a vertical column of said record sheet and said rows provide spaces for identifying information relating to vehicles to be worked on by the shops whereby each vehicle to be worked on may have one horizontal row assigned thereto.

References Cited
UNITED STATES PATENTS

| | | | |
|---|---|---|---|
| 2,066,818 | 1/1937 | Beall | 35—48 |
| 2,575,269 | 11/1951 | Hall. | |
| 2,871,594 | 2/1959 | Halpert | 40—63 |

EUGENE R. CAPOZIO, *Primary Examiner.*

WILLIAM H. GRIEB, *Examiner.*